United States Patent [19]

Suzuki et al.

[11] 4,090,743
[45] May 23, 1978

[54] FLUID BEARING INCLUDING BOTH HYDRODYNAMIC AND HYDROSTATIC BEARINGS

[75] Inventors: Hiroshi Suzuki, Okazaki; Toshio Tsujiuchi, Anjo; Masanobu Goto, Kariya, all of Japan

[73] Assignee: Toyoda-Koki Kabushiki-Kaisha, Japan

[21] Appl. No.: 759,675

[22] Filed: Jan. 17, 1977

[30] Foreign Application Priority Data

Feb. 17, 1976  Japan .................................. 51-16229

[51] Int. Cl.$^2$ ............................................. F16C 35/00
[52] U.S. Cl. ........................................ 308/9; 308/73; 308/122; 308/170; 308/240
[58] Field of Search .................. 308/9, 122, 121, 160, 308/73, DIG. 1, 35, 76–77, 240, 237 R, 237 A, 168, 170, 107, 172, 187, 169, DIG. 4; 277/DIG. 5

[56] References Cited

U.S. PATENT DOCUMENTS

| | | | |
|---|---|---|---|
| 3,499,692 | 3/1970 | Kaiser | 308/9 |
| 3,708,215 | 1/1973 | Wilcock et al. | 308/9 |
| 3,945,692 | 3/1976 | Tsujiuchi | 308/9 |

*Primary Examiner*—Trygve M. Blix
*Assistant Examiner*—Douglas C. Butler
*Attorney, Agent, or Firm*—Oblon, Fisher, Spivak, McClelland & Maier

[57] ABSTRACT

A fluid bearing for rotatably supporting a rotary shaft comprising a hydrodynamic bearing formed on a loaded side. A hydrostatic bearing is formed in axially juxtaposed relationship with the hydrodynamic bearing. An annular partition groove is formed between the hydrodynamic and hydrostatic bearings for supplying pressurized fluid from the hydrostatic bearing to the hydrodynamic bearing.

6 Claims, 4 Drawing Figures

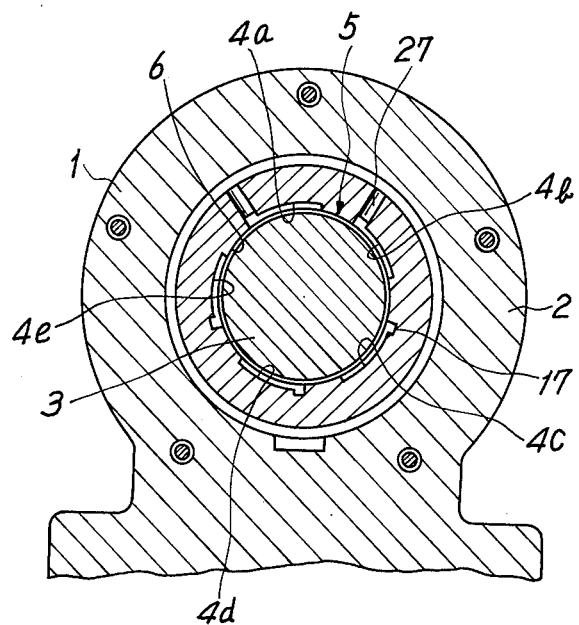
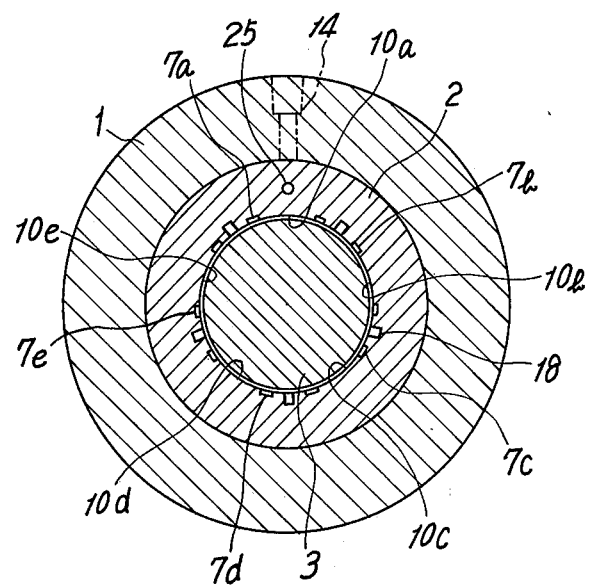

FLUID BEARING INCLUDING BOTH HYDRODYNAMIC AND HYDROSTATIC BEARINGS

BACKGROUND OF THE INVENTION

1. Field of the Invention

The present invention relates to a fluid bearing for supporting a rotary shaft by means of a pressurized fluid.

2. Description of the Prior Art

The hydrodynamic bearing has both high load-supporting capacity and rigidity to support a rotary shaft during rotation of the rotary shaft, but cannot maintain stable operation for a long time, since wear is created by the metallic contact between the bearing surface and the rotary shaft at the start or stop of the rotation. On the other hand, the hydrostatic bearing can advantageously support a rotary shaft at its center with or without the rotation of the rotary shaft to thereby provide a good centripetal force and small wear loss. However, if the rotary shaft is continuously rotated without a supply of pressurized fluid, as a result of possible power failure seizure may be caused.

SUMMARY OF THE INVENTION

It is therefore an object of the present invention to provide a new and improved fluid bearing having hydrodynamic and hydrostatic bearings for supporting a rotary shaft with high rigidity.

Another object of the present invention is to provide a new and improved fluid bearing wherein an annular partition groove is formed between the hydrodynamic and hydrostatic bearings to prevent interference therebetween and to supply pressurized fluid from the hydrostatic bearing to the hydrodynamic bearing.

Briefly, according to the present invention, these and other objects are achieved by providing a fluid bearing for rotatably supporting a rotary shaft subjected to a radial load at one end of the fluid bearing, which comprises a stationary housing, a bearing bushing fixedly inserted in the stationary surface defining a first small clearance with the rotary shaft, a plurality of bearing pads formed on a loaded side of the bearing surface in a circumferential direction and defining a second small clearance with the rotary shaft which is larger than the first clearance, a plurality of closed fluid pockets formed on the bearing surface in a circumferential direction in axially juxtaposed relationship with the bearing pads and defining a third small clearance with the rotary shaft which is larger than the first clearance, supply means for supplying a pressurized fluid, throttle means connected between the supply means and the fluid pockets, exhaust means formed on the bearing surface outside the bearing pads and the fluid pockets for discharging pressurized fluid, and an annular partition groove formed on the bearing surface between the bearing pads and the fluid pockets for supplying pressurized fluid from the fluid pockets to the bearing pads.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 3 is a sectional view taken along the lines III—III in FIG. 1; and

FIG. 4 is a sectional view taken along the lines IV—IV in FIG. 1.

DETAILED DESCRIPTION OF THE PREFERRED EMBODIMENT

Figure 1:
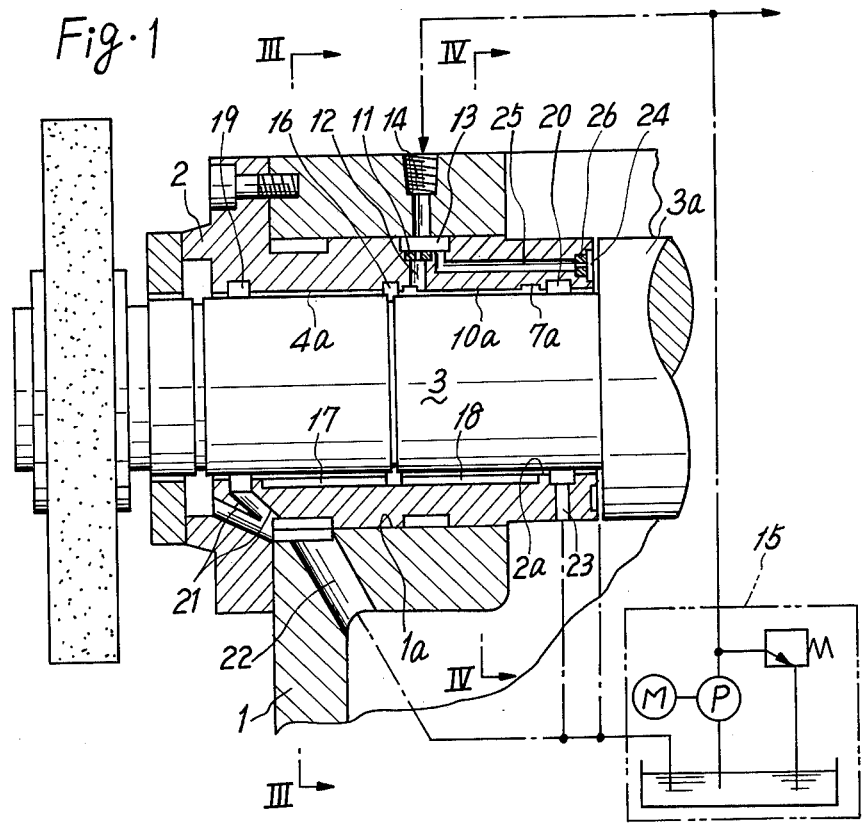
FIG. 1 is a longitudinal sectional view of a fluid bearing according to the present invention.
Figure 2:
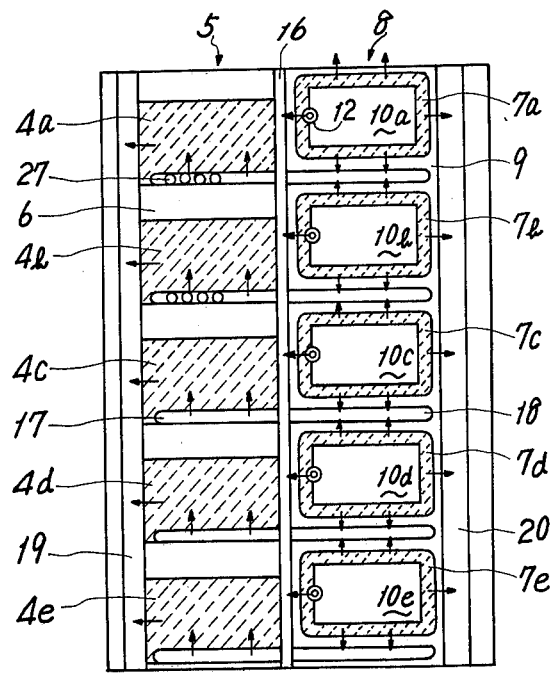
FIG. 2 is a development of a bearing surface.

Referring now to the drawings, wherein like reference numerals or characters refer to identical or corresponding parts throughout the several views, and more particularly to FIG. 1, there is shown a fluid bearing provided with a stationary housing 1 having an inner bore 1a, within which a bearing bushing 2 is fixedly inserted. The bearing bushing 2 is provided with an inner bore or bearing surface 2a which is formed coaxially with the bore 1a of the housing 1. The bearing surface 2a provides rotatable support of a rotary shaft 3, subjected to a radial load at one end of the fluid bearing by means of pressurized fluid supplied into a small clearance formed between the bearing surface 2a and the outer surface of the rotary shaft 3. A hydrodynamic bearing 5 is formed on the loaded side of the bearing surface 2a and is provided with a plurality of bearing pads 4a to 4e which are equidistantly arranged in the circumferential direction, as shown in FIGS. 2 and 3. A land portion 6 of the bearing surface 2a is formed between the two adjacent bearing pads and defines a small clearance with the rotary shaft 3. A clearance between the bearing pads 4a to 4e and the rotary shaft 3 is formed larger than that between the land portion 6 and the rotary shaft 3. A hydrostatic bearing 8 is formed on the bearing surface 2a in an axially juxtaposed relationship with the hydrodynamic bearing 5 and is provided with a plurality of closed fluid pockets 7a to 7e which are equidistantly arranged in the circumferential direction and are rectangular in shape, as shown in FIGS. 2 and 4. A land portion 9 of the bearing surface 2a is provided on the periphery of the fluid pockets 7a to 7e and defines a small clearance with the rotary shaft 3. Land portions 10a to 10e of the bearing surface 2a are also provided within the respective fluid pockets 7a to 7e for damping. A clearance between the fluid pockets and the rotary shaft 3 is formed larger than those between the land portion 9 and the rotary shaft 3, and between the land portions 10a to 10e and the rotary shaft 3. The fluid pockets 7a to 7e are connected to an annular groove 13 formed on the outer periphery of the bearing bushing 2 through passages 12 and throttles 11 formed in the bearing bushing 2. The annular groove 13 is, in turn, connected to a supply port 14 formed on the housing 1. The supply port 14 is adapted to receive incompressible pressurized fluid, such as lubricating oil, from a pressure fluid supply source 15 through a pump and a relief valve.

An annular partition groove 16 is formed on the bearing surface 2a between the hydrostatic bearing 5 and the hydrodynamic bearing 8 to prevent interference therebetween. Axial fluid communicating grooves 17 and 18 are formed on each of the bearing pads 4a to 4e and on the land portion 9 between two adjacent fluid pockets, respectively, to communicate with the partition groove 16 in such a manner that a portion of the pressurized fluid supplied within the fluid pockets 7a to 7e is exhausted through the land portion 9 to the fluid communicating groove 18 and the partition groove 16, as indicated by arrows in FIG. 2, and then this exhausted fluid is supplied from the partition groove 16 through the fluid communicating groove 17 into the bearing pads 4a to 4e.

Annular exhaust grooves 19 and 20 are formed on opposite ends of the bearing surface 2a. The exhaust groove 19 on the side of the hydrodynamic bearing 5 communicates with a reservoir in the supply source 15 through exhaust passages 21 and 22 formed in the bearing bushing 2 and the housing 1, respectively. The exhaust groove 20 on the side of the hydrostatic bearing 8 communicates with the reservoir through an exhaust passage 23 formed in the underside of the bearing bushing 2. An annular pocket 24 is formed in the inner end of the bearing bushing 2 and faces a flange portion 3a formed at the central portion of the rotary shaft 3. The supply of pressurized fluid from the supply source 15 through a passage 25 and a throttle 26 formed in the bearing bushing 2 to the annular pocket 24 supports the rotary shaft 3 in a thrust or axial direction. Exhaust passages 27 communicating with the exhaust passage 22 are formed only on the fluid communicating grooves 17 located at the upper or radially unloaded side among the grooves 17 formed on the bearing pads 4a to 4e, as shown in FIGS. 2 and 3, to decrease the loss of the exhaust fluid supplied from the hydrostatic bearing 8 to the hydrodynamic bearing 5.

In the above-described fluid bearing, when pressurized fluid is supplied from the supply source 15 to the supply port 14, the pressurized fluid is introduced into the fluid pockets 7a to 7e through the annular groove 13, the throttle 11 and the passage 12. The pressurized fluid introduced into the fluid pockets 7a to 7e flows out through the surrounding land portion 9 to the exhaust groove 18. The hydrostatic pressure is created within the fluid pockets 7a to 7e, depending upon the flow resistance at the throttle 11 and the land portion 9 to act on the rotary shaft 3. Accordingly, the rotary shaft 3 is supported at the center of the bearing surface 2a in a floating manner. In this way, the rotary shaft 3 is journalled by the hydrostatic pressure of the hydrostatic bearing 8 at the start (or at the stop) of the rotation of the rotary shaft 3.

The exhaust fluid delivered from the fluid pockets 7a to 7e into the exhaust groove 20 is returned to the reservoir through the exhaust passage 23, and a greater part of the exhaust fluid delivered into the fluid communicating groove 18 is introduced into the partition groove 16 and is supplied through the fluid communicating groove 17 to the bearing pads 4a to 4e. Accordingly, hydrodynamic pressure is created in the bearing pads 4a to 4e during the rotation of the rotary shaft 3 to thereby increase the rigidity to support the rotary shaft 3 positively. The exhaust fluid delivered from the bearing pads to the exhaust groove 19 is returned to the reservoir through the exhaust passages 21 and 22.

In the above-described embodiment, fluid communicating grooves 17 and 18 are provided in order to supply the exhaust fluid from the fluid pockets 7a to 7e to the hydrodynamic bearing 5. The exhaust fluid may be directly supplied from the partition groove 16 to the hydrodynamic bearing 5 without providing the fluid communicating grooves 17 and 18.

Obviously, numerous modifications and variations of the present invention are possible in light of the above teachings. It is to be understood therefore that within the scope of the teachings herein, and the appended claims, the invention may be practiced otherwise than as specifically described herein.

What is claimed as new and desired to be secured by Letters Patent of the United States is:

1. A fluid bearing for rotatably supporting a rotary shaft subject to a radial load at one end of the fluid bearing comprising:
   a stationary housing;
   a bearing bushing fixedly inserted in said stationary housing and having an internal bore which forms a bearing surface defining a first small clearance with the rotary shaft;
   a plurality of bearing pads formed on a loaded side of the bearing surface in a circumferential direction and defining a second small clearance with the rotary shaft which is larger than the first clearance;
   a plurality of fluid pockets formed on the bearing surface in a circumferential direction in axially juxtaposed relationship with said bearing pads and defining a third small clearance with the rotary shaft which is larger than the first clearance;
   supply means for supplying a pressurized fluid;
   throttle means connected between said supply means and said fluid pockets;
   exhaust means formed on the bearing surface outside said bearing pads and said fluid pockets for discharging pressurized fluid; and
   an annular partition groove formed on the bearing surface between said bearing pads and said fluid pockets for supplying pressurized fluid from said fluid pockets to said bearing pads.

2. A fluid bearing as claimed in claim 1, wherein each of said bearing pads is formed with an axial groove connected to said partition groove.

3. A fluid bearing as claimed in claim 2, wherein the axial grooves formed on the bearing pads located at a radially unloaded side are connected to said exhaust means.

4. A fluid bearing as claimed in claim 1, wherein a axial groove is formed on the bearing surface between two adjacent fluid pockets and connected to said partition groove.

5. A fluid bearing as claimed in claim 1, including throttle means connected to said supply means and facing a flange portion of said rotary shaft.

6. A fluid bearing as claimed in claim 1, wherein each of said fluid pockets is rectangular in shape.

* * * * *